Dec. 28, 1965  S. T. GUSTAVSON  3,225,773
METHOD OF MAKING A MULTIPLE-LENGTH CIGAR BUNCH UTILIZING AN
APPROXIMATE HORSESHOE SHAPED BINDER
Filed Oct. 2, 1963  6 Sheets-Sheet 2

INVENTOR
STERLING T. GUSTAVSON
BY
ATTORNEY

INVENTOR
STERLING T. GUSTAVSON
BY
ATTORNEY

Dec. 28, 1965　　　　S. T. GUSTAVSON　　　　3,225,773
METHOD OF MAKING A MULTIPLE-LENGTH CIGAR BUNCH UTILIZING AN
APPROXIMATE HORSESHOE SHAPED BINDER
Filed Oct. 2, 1963　　　　　　　　　　　6 Sheets-Sheet 4
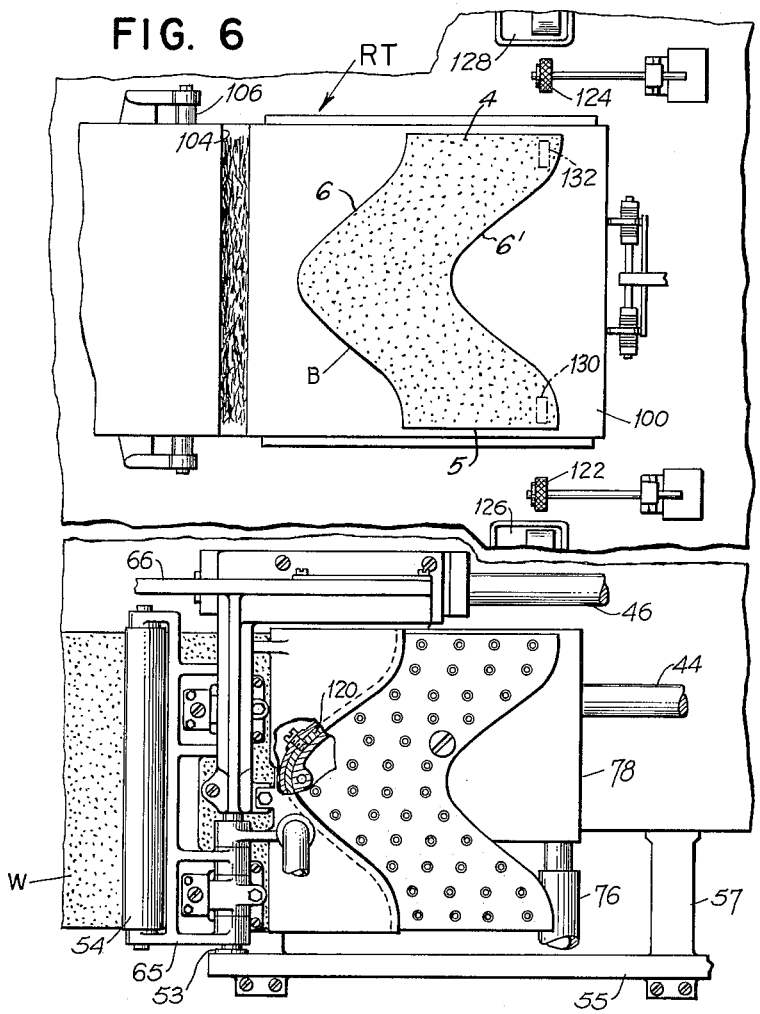
FIG. 6
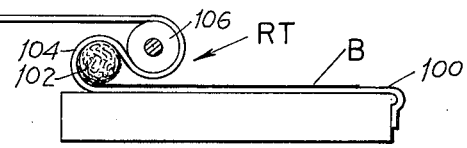
FIG. 7
FIG. 8
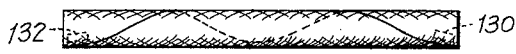
INVENTOR
STERLING T. GUSTAVSON
BY
ATTORNEY Dec. 28, 1965  S. T. GUSTAVSON  3,225,773
METHOD OF MAKING A MULTIPLE-LENGTH CIGAR BUNCH UTILIZING AN
APPROXIMATE HORSESHOE SHAPED BINDER
Filed Oct. 2, 1963  6 Sheets-Sheet 5

INVENTOR
STERLING T. GUSTAVSON
BY Bradley Cohn
ATTORNEY

Dec. 28, 1965  S. T. GUSTAVSON  3,225,773
METHOD OF MAKING A MULTIPLE-LENGTH CIGAR BUNCH UTILIZING AN
APPROXIMATE HORSESHOE SHAPED BINDER
Filed Oct. 2, 1963  6 Sheets-Sheet 6

INVENTOR
STERLING T. GUSTAVSON

BY *Bradley Cohn*

ATTORNEY 3,225,773
METHOD OF MAKING A MULTIPLE-LENGTH CIGAR BUNCH UTILIZING AN APPROXIMATE HORSESHOE SHAPED BINDER
Sterling Ture Gustavson, Rosedale, L.I., N.Y., assignor to American Machine & Foundry Company, a corporation of New Jersey
Filed Oct. 2, 1963, Ser. No. 313,390
4 Claims. (Cl. 131—20)

This invention is an improved method of making cigar binders and wrappers, as well as an improved method of making cigar bunches and cigars per se. In one of its aspects, the invention is a method of speeding up the production of cigars, by forming a binder of proper shape and large enough to enclose tobacco filter disposed in multi-bunch length and thereafter, enclosing the multi-bunch length filler in the binder, to form a bunch of multi-bunch length. Wrappers of substantially the same shape as the binders of the present invention and large enough to enclose a multi-length bunch are then wrapped around the bunch to form cigars of multi-length which may thereafter be severed into a number of cigars, from two to six, or more, for instance.

In practicing the invention a wide web of reconstituted tobacco may be used advantageously. However, the invention may be carried out by employing a narrow web of reconstituted tobacco or natural leaf tobacco and it may be carried out by hand instead of by machine.

An object of the invention is an improved method of manufacturing cigars.

Another object of the invention is increased cigar output, whether by hand or machine, by forming cigar bunches or cigars of multi-length, which bunches or cigars may thereafter be divided into individual lengths.

Another object of the invention is to sever a multi-length U-shaped cigar binder and a multi-length U-shaped cigar wrapper from tobacco webs and to form a multi-length cigar bunch and a multi-length cigar during each cycle of operation of a new type of cigar machine. The machine operates in such manner that a binder and a wrapper are cut and a bunch and a cigar are rolled, all of multi-unit length, during each machine cycle. The output of the machine is increased, not only by virtue of the multi-unit aspect, but because the wrapping is performed on a rolling table resembling a bunch rolling table, which is faster than the method of rolling most widely employed in the industry. The period for a cycle of operation of the machine is therefore shorter notwithstanding its greatly increased output.

In one embodiment of the invention, a binder of multi-length, shaped according to the teaching hereinafter, is cut from a wide tobacco web and enough filler to form a multi-length bunch is wrapped in the binder. A multi-length wrapper of a shape corresponding to that of the binder is wrapped around the multi-length bunch, to form a multi-length cigar structure, which is then severed into a number of unitary cigars.

In another embodiment the multi-length bunch is severed into a number of individual bunches, each of which is wrapped in an individual wrapper which may be of conventional shape.

The invention depends on the unique contour of the multi-length binder, the shape of which permits bunches of multi-length to be formed successfully. This was not possible heretofore. The forming of multi-length cigars depends upon the fact that a wrapper shaped in the same manner as the unique binder may be successfully wrapped about the multi-length bunch.

Most cigars are produced in this country by winding a cigar binder, cut from natural tobacco leaf or from reconstituted tobacco web, spirally about tobacco filler, which may be formed of either long or short shreds, to form a cigar bunch, and then winding a cigar wrapper, cut from either natural leaf or reconstituted tobacco web, about the cigar bunch to form a cigar. The reason for winding the binder and the wrapper spirally is that spiral winding adds strength to the structure. The shorter the pitch of the spiral, the stronger the structure. This may be appreciated from consideration of a spiral spring, the greater the spacing between convolutions, the weaker the spring. If cigars were formed like cigarettes, by enclosing the tobacco in one turn of a rectangular tobacco envelope, and pasting along the length of a straight line seam, they would not be sufficiently rigid.

In the current method of manufacture, when a bunch or a cigar is formed by spirally winding a tobacco covering about a bunch or a cigar, the winding starts at the end which is to be lighted, generally called the "tuck" end, and the winding proceeds continuously in one direction toward the opposite end. Each convolution which is wound on the structure is partially covered by the next succeeding one. Paste is applied only to a portion of the last convolution, that is to the portion which is to be put into the smoker's mouth, generally called the "head" end. In the manufacture of cigars having shaped ends, the binders and wrappers generally are so designed that an extra amount of tobacco material is wound onto the head end to provide reinforcement against disintegration due to the bite and saliva, and the amount applied over the other areas is intended to be sufficient to afford a predetermined amount of rigidity in the structure and to insure even burning. This latter consideration requires special provision at the tuck end of a cigar of the so-called perfecto shape, which is of reduced size at both ends. However, assuming such a spirally wound bunch, or cigar, or whatever length, saving paste applied only at the head end, and assuming that it were to be cut laterally in the middle, with the purpose of forming two independent rigid cigar structures, the binder or wrapper on that severed portion of the bunch, or cigar, having the original tuck end would uncoil, because it would have no paste applied to its head end. The present invention affords a binder and a wrapper having a special shape, and a novel method of rolling the bunch or cigar, and of pasting the binder or wrapper to the bunch or cigar, respectively, which permits such cigar structures having a length equal to that of a number of bunches, or of a number of cigars, to be formed during each cycle of operation of the machine, which cigar structures upon being severed will remain intact, that is to say, the binder or wrapper will not uncoil from any structure so formed upon severance.

Because of the shape of the present binder and wrapper, its singular difference from convential binder shapes, and its resemblance to a horseshoe, or a U, it is becoming known in the trade as the "horseshoe" or U binder or wrapper. It may be employed to form cigars from either long or short filler. It is so shaped because applicant has found that a cover of such a shape may be wound about the filler or bunch in a novel manner, to be explained hereinafter, which prevents unwinding after severance and affords increased rigidity of the structure. Further it has been found that it may be coiled about the filler or bunch with a relatively small overlap, or superposition of the coiled layers, and nevertheless provide greater than normal firmness and high holding power. By this latter is meant the ability of the coils of the spirally wound cover to tend to draw the filler or bunch together into a rigid structure by exerting a pull, as it were, in the direction of the longitudinal axis. Increased holding power is obtained when the spiral angle of the binder, relative to the longitudinal axis of the bunch, is greater than 45 degrees. Then the coils tend to be relatively closer together and tend to make the structure more compact in the direction of its longitudinal axis. The present cover has these desirable characteristics.

In the machine manufacture of cigar bunches, when a binder is coiled spirally about tobacco filler in a bunch, during the rolling of a bunch, the filler is first enfolded in a loop, or fold, near an end of a fixed rectangular apron secured on the surface of a bunch rolling table, and the binder is secured to the surface of the apron by suction, at an angle to the transverse normal of the apron with its nearest corner slightly spaced from the filler. The ends of the apron are fixed in position as the loop, or fold, in the apron, holding the filler, is rolled progressively toward the binder, like a wave or a ripple on the surface of the apron, and then over the binder in such manner that the section of the apron to which the binder is applied becomes progressively a part of the loop and the binder is spiralled about the filler within the loop, and progresses from one end of the cylinder of filler to the other as the loop moves toward the opposite end of the table.

From the foregoing, it should be apparent that the filler at first is completely uncovered. Then, in the current method, as rolling begins, the filler enclosed in the moving apron loop encounters a corner of the binder on the apron surface. The binder is first coiled about one end of the filler and as the rolling continues the uncovered portion of the filler becomes progressively encoiled in the binder until all of the filler is enwrapped.

It should be apparent from the foregoing also that the rolling of a bunch for a long cigar, or of a multi-length bunch, would ordinarily present a problem, in that a long length of the filler would have to be rolled for a considerable distance while still unenclosed in the binder. Maintaining a long length of unenclosed, relatively loose tobacco substantially in the form of a cylinder, while it is rolled through a long distance, is difficult. Bunches for short cigars, with binder contours having a spiral angle of between 45 degrees and 90 degrees, with respect to the longitudinal axis of the bunch, may be made without difficulty. The reason is that, in the case of bunches for short cigars, the length of travel of the filler, while unbound during rolling, is short. For bunches for longer cigars, those for instance, ranging between 6 inches and 9½ inches in length, the distance which the unbound filler must travel is greater and the satisfactory performance of the rolling operation is correspondingly difficult. For the rolling of multi-length bunches, contemplated in the present invention, satisfactory results with such rolling would be impossible. The present invention solves this problem by forming the binder in the shape of a single U, to cover a bunch long enough for two cigars. The number of unitary bunches which may be enclosed in a single multi-bunch binder may be increased by adding other U-shaped units end on end. Thus a binder cut in the form of two U's would enclosed four bunches for four individual cigars. One and one-half U's would accommodate three and two and one-half, five.

In accordance with the present invention, the rolling of a bunch long enough for two cigars starts simultaneously from the two ends of the U-shaped binder and the two ends of the filler and progresses toward the middle of both the binder and filler, or, alternatively, it starts from the middle of the binder and the middle of the filler and progresses simultaneously toward the two ends of both. The length of travel of the unbound filler during rolling will therefore be approximately one-half of the length of rolling when wound in the usual manner. The contour of the U-shaped binder is such that the rolling angle of the binder, except at the ends of the double bunch, is between 45 degrees and 90 degrees with respect to the longitudinal axis of the bunch. This, as mentioned in the foregoing, gives maximum firmness and holding power. The angle of the spiral at the ends of the bunch with respect to the longitudinal axis of the bunch is less than 45 degrees. This would not be desirable. However, since the ends are crimped, the ends are made firm by the crimping pressure.

When a binder comprising two or more U-sections joined together is wound in either direction about filler long enough for four, or six, bunches, each double unit is wound in a manner corresponding to the foregoing. When multi-unit wrappers are wound on multi-unit bunches, the method of rolling is substantially the same as for wrapping a binder about a bunch except that the problem is simplified because the bunch is a relatively rigid structure contrasted with the comparatively loose cylinder of filler tobacco, particularly when short shred filler is used.

It was stated in the foregoing that one of the advantages of the invention is that, a smaller amount of superposition of successive spiral turns of the binder, or wrapper, is satisfactory. Ordinarily, it is considered that in order to make a firm bunch, the length of the convolutions of binder, or wrapper, overlying any lateral cross section of a bunch or cigar, respectively, should be twice the circumference of the bunch or cigar plus one-quarter of an inch to afford corresponding firmness. This effects a substantial saving in the costly tobacco ordinarily used in the binders and wrappers.

When the U-shaped binder of the present invention of a size to enclose two bunch units is rolled onto the bunch from the arcuate center of the U toward the two ends, both ends are pasted. When the binder is rolled from the two ends toward the center, the center only is pasted. In this case the paste is applied in such manner that, after severance, the binder will be secured against unravelling from each of the two binders thus formed. Thereafter, a U-shaped wrapper may be applied to the double length bunch which may thereafter be severed to form two cigars. Alternatively, the double length tobacco bunch may be severed midway between its ends to form two bunches which may be individually wrapped according to well know practice.

When the binder is formed of a succession of U-shaped units, such as two or three or more, to enclose four, or six, or more bunch units, rolling starts simultaneously at the midpoint of the arc of each of the two, or three, or more, U's, or alternatively at the ends of the legs of the joined U's. In wrapping such bunches the same is true.

The U-shaped binder, or wrapper, or templet, as it is sometimes called may, as mentioned heretofore, be made from a continuous web of tobacco material through the operation of a single knife, or curvilinear cutting element, curved to an approximate horseshoe or U-shaped contour, and having as many U-shaped curves therein as desired dependent upon the number of bunches or wrappers to be formed. The knife severs the web from edge to edge leaving the edges of the web rectilinear. Forming the first templet requires two operations of the knife. Each succeeding operation of the knife forms the rear end of one templet, and the front end of another templet, so that in effect, a binder or a wrapper is formed during each operation of the knife. After a templet has been formed, the leading end of the web is drawn forward between knife operations, a distance correlated to the diameter of the cigar to which it is to be applied. As mentioned heretofore, because of the shape of the templet, the rolling of a bunch or cigar may be performed at a better angle and less overlap of the binder is required.

In addition to the savings obtainable through faster production, other important advantages resulting from the invention are:

(1) A firmer bunch or cigar with less overlap because of the improved rolling angle;

(2) A large saving in tobacco material because of the smaller overlap and a consequent narrower templet;

(3) There is no waste in the cutting of the templet, since the web is cut from edge to edge and no trimming is required;

(4) The rolling table may be made substantially shorter than usual, because of the narrowness of the templet.

While the invention has been described in the foregoing as applied to long cigar structures, which are later to be severed, to a predetermined length, to form two or more cigars, it should be obvious that the invention is applicable to single cigars, particularly to single long cigars, that is to say, to cigars of such a length that maintaining the filler, particularly short filler, in proper form for rolling presents a problem. The advantages inherent in the method, that is a short rolling traverse before all of the filler is enclosed in the binder, a more rigid structure, and a saving in the expensive cover material, are equally available as applied to a single cigar of any length, long or short, without limitation.

The invention may be understood from the following description when read with reference to the associated drawings, which taken together disclose preferred embodiments in which the invention is presently incorporated. It is to be understood, however, that the invention may be incorporated in other embodiments which may be suggested to those skilled in the art from a consideration of the following.

In the drawings:

FIG. 6 is a plan view of a suction feed box in conjunction with a suction table and a bunch rolling table designed for forming a bunch in which the binder is rolled about the filler by starting the rolling operation at the middle of the binder and then rolling simultaneously toward the two ends;

FIG. 7 is a diagrammatic view showing a binder being coiled about a bunch in the loop of an apron on a rolling table;

FIG. 8 shows, in side elevation, or plan, a bunch formed by rolling the binder from the middle simultaneously toward the two ends;

The invention will first be described with respect to an arrangement in which a double length cigar binder is formed and applied to a double length filler to form a double length bunch. There are two embodiments of this, the first is shown in FIGS. 1, 2, 3, 4 and 5. The second in FIGS. 6 and 8. FIG. 7 is common to both.

Refer now to FIGS. 1, 2, 3, 4, 5 and 7.

The machine of the present invention, except for the shape and size of the binder cutting mechanism, closely resembles other machines well known in the art. It will be described, therefore, only insofar as it is necessary to an understanding of the present invention.

The reader is referred to Patent 2,846,010, granted to H. H. Wheeler, August 5, 1958 for a detailed description of a machine generally resembling the present machine, except for the contour and size of the binder and the alternative two methods of rolling a bunch. Another patent to which reference may be had for a description of the machine presently used in the art is Patent 3,016,779, granted to applicant and V. G. Hanson, January 16, 1962.

Figure 1:
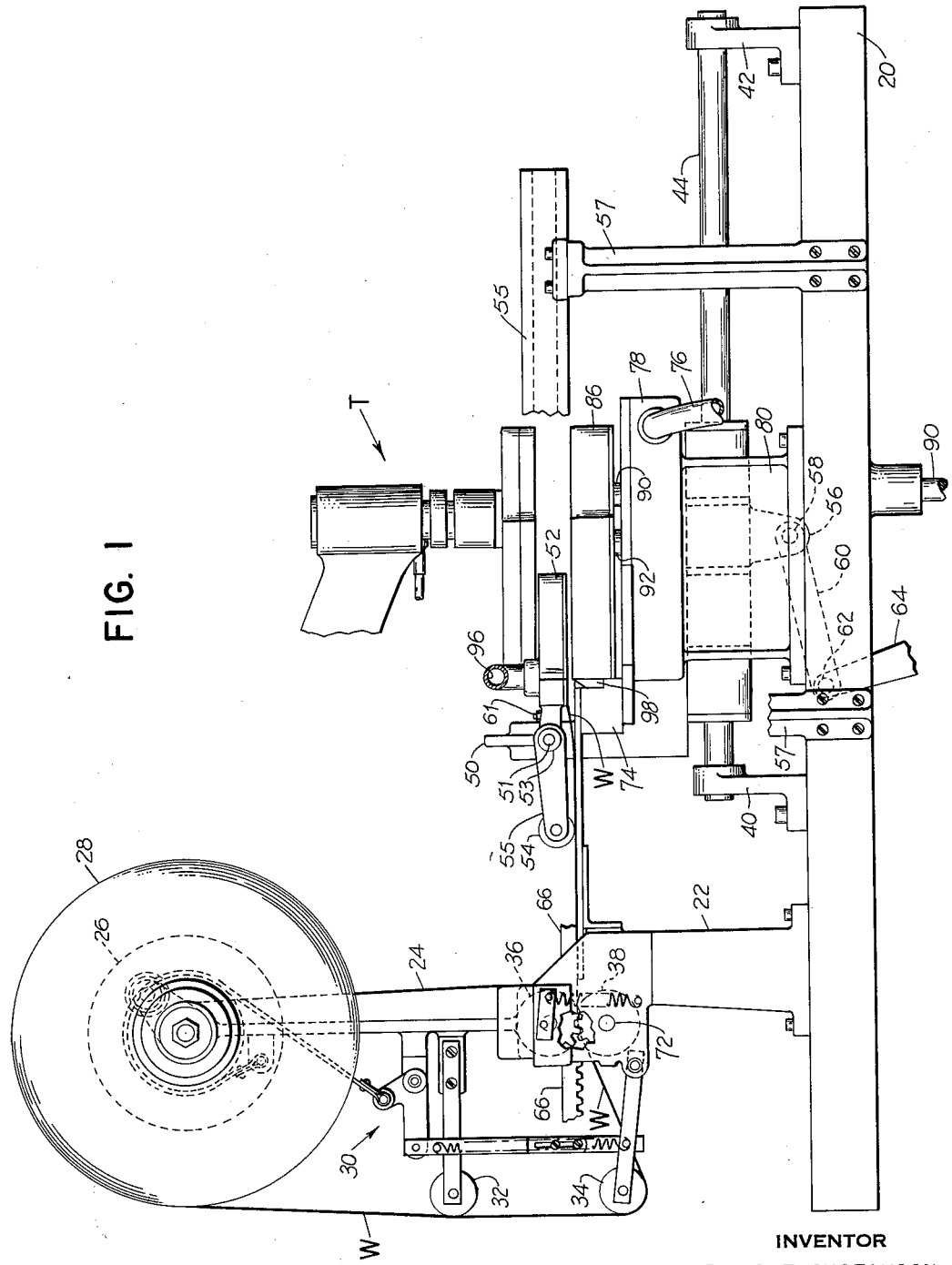
FIG. 1 shows a side elevation of the upper portion of a wide web feed machine for making binders in accordance with the present invention.

Refer now to FIG. 1 herein. A portion of a machine base 20 supports a bracket 22 on which is mounted a bracket 24. Rotatably mounted in bracket 24 is a flanged hub 26 which carries a reel of reconstituted tobacco 28. The reel is provided with braking mechanism generally indicated by 30. The reconstituted tobacco is directed over rollers 32 and 34 and is drawn intermittently toward the right by coacting feed rollers 36 and 38 and moving carriage 52. The tobacco web passes through the space between the rollers and is frictionally engaged by them. The lower feed roller 38 is mounted on a shaft 72 which is driven intermittently in clockwise direction through a pinion 68 which through a conventional one-way clutch 70 is connected to the feed drive shaft 72. Pinion 68 engages with a rack 66, the rack being reciprocated horizontally by traveling carriage 48 to which it is secured. Mounted on the base 20 is a pair of brackets 40 and 42. Fixed in brackets 40 and 42 is a pair of horizontal shafts 44 and 46. Slidably mounted on shaft 46 is a horizontally reciprocating carriage 48. Carriage 48 is provided with a transverse arm 50 which by means of a pair of suitable spaced lugs carries a stationary transverse shaft 51 to the extended free end of which is rotatably mounted a roller 53 which engages with a longitudinal track 55 held by a pair of suitable brackets 57 secured to the base plate 20.

The transverse shaft 51 of the carriage arm 50 pivotally supports a traveling suction head 52 by means of a pair of spaced bearing arms 59 integral with and extending from the rear end of said suction head 52. A vertical threaded stud 61 carried by the rear end of the suction head 52 contacts and rests on a suitable lug 63 (FIG. 2) extending from the carrier arm 50 and thus permits the desired horizontal setting of the suction head 52. To transverse shaft 51 is also pivotally mounted a forked cutting roller supporting arm 65 which carries a rotatably mounted cutting roller 54. The cutting roller supporting arm 65 is also provided with a spring tension mechanism 67 (FIG. 2) by means of which it is yieldingly connected to suitable lugs 69 stationarily mounted on the transverse shaft 51. The spring tension mechanism 67 is well known in the art and employed for the purpose of adjusting the tension on roller 54 to maintain proper coaction between said roller and the knife 98 over which it has to travel.

Figure 2:
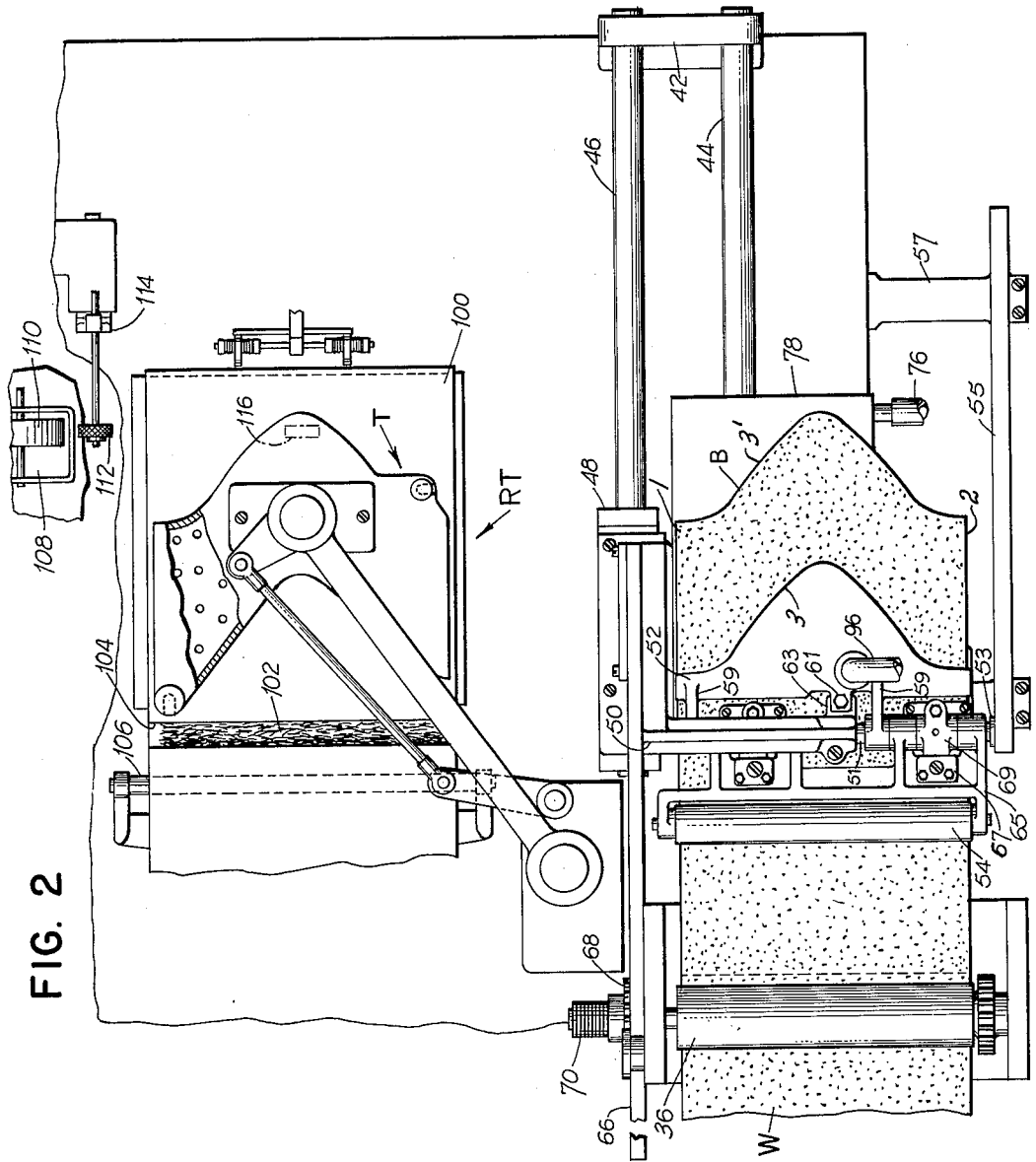
FIG. 2 shows a partial plan view of the machine, illustrating a cut binder ready to be transferred to a rolling table to form a bunch by rolling the binder about the filler starting at the two ends simultaneously and rolling toward the middle.

The lower portion of traveling carriage 48 is provided with a lug 56, carrying a stud 58 which by means of a link 60 is connected to a stud 62 carried at the upper free end of cam lever 64. Cam lever 64 is oscillated by means of a suitable cam (not shown) and thus imparts reciprocating motion to the carriage, to the right and to the left, as shown in FIG. 2. The rack 66 engages with a pinion 68. The hub of pinion 68 engages with a conventional one-way ball clutch 70 employed for the purpose of changing the reciprocating movement of traveling carriage 48 to one-way intermittent rotary motion of shaft 72.

Operation is started by placing the leading end of the reconstituted tobacco web W on the top surface of a hollow pick-up table 74. The top surface of table 74 is provided with a plurality of holes and the table proper by means of a duct 75 is connected to a suction chamber 78 which, in turn, through duct 76 is connected to a suitable source of suction (not shown). Suction chamber 78 is mounted on vertical bracket 80, secured to machine frame 20. As mentioned above, the upper surface of pick-up table 74 is provided with apertures by means of which suction can be applied to the web W to hold it in position adjacent the vertically reciprocable suction table 86.

Figure 3:
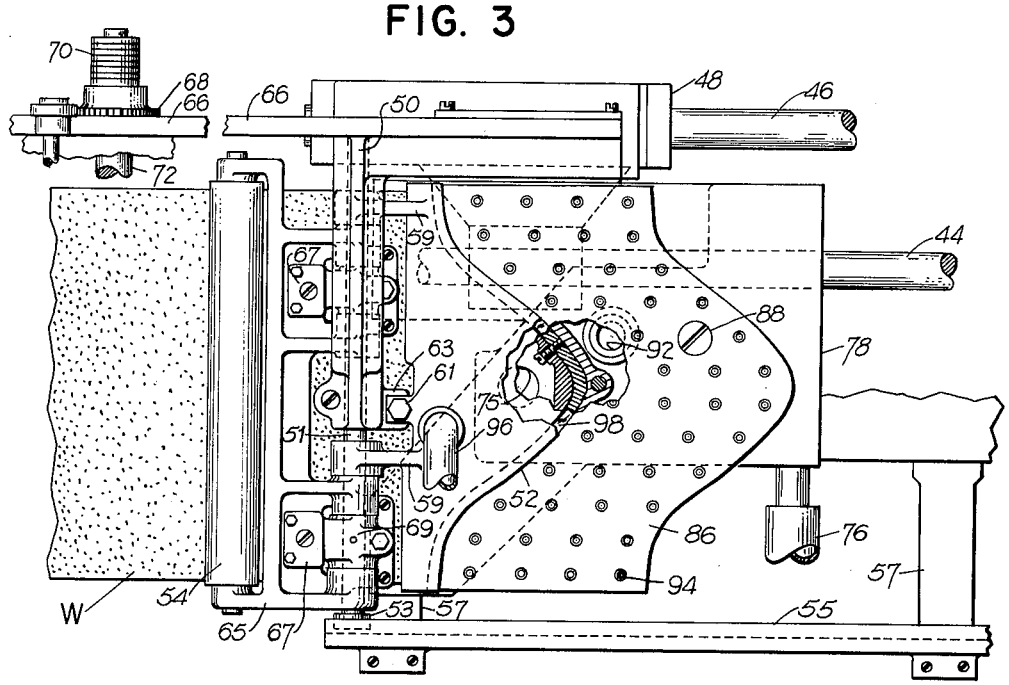
FIG. 3 is a plan view of the horizontally reciprocating upper suction box and the vertically reciprocating suction table.
Figure 4:
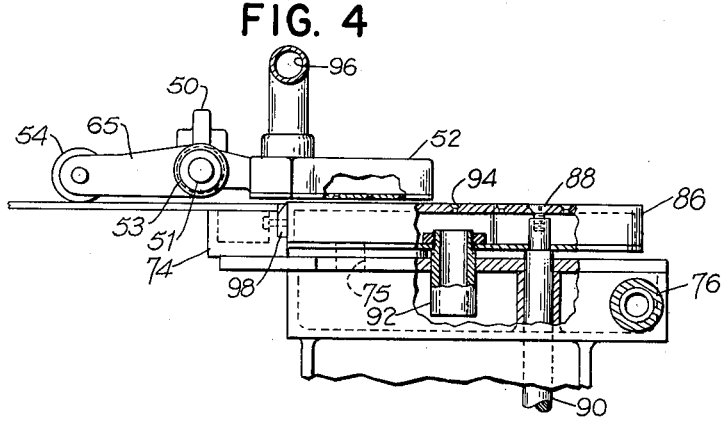
FIG. 4 is a side elevation of the same partly in section.

As best seen in FIGS. 3 and 4, vertically reciprocable table 86 is mounted by means of a screw 88 to the top of a vertical shaft 90. The shaft 90 is reciprocated vertically in a well known manner under control of cam mechanism, (not shown). The fixed suction chamber 78 communicates with the cavity in table 86 by means of duct 92 which is secured to the latter and slidably projects into chamber 78. The upper surface of table 86 is provided with apertures such as 94 by means of which suction may be applied to the tobacco web. The interior of the traveling suction head 52 is hollow and is connected to a source of suction by means of duct 96. The lower surface of traveling suction head 52 is provided with apertures by means of which suction may be applied to the tobacco web 28.

The mechanism is provided with air valves and linkages connected to cams, all not shown, but well understood in the art, by means of which suction may be applied to the pick-up table 74 to hold the web in position adjacent the vertically reciprocable table. The suction is transferred from pick-up table 74 to the traveling suction head 52 which picks up the leading end of the web and draws it toward the right as seen in FIGS. 1, 2, 3 and 4. When the web has been advanced a predetermined distance, and reaches the right-hand end of table 86, suction is transferred from the traveling suction head 52 to the vertically reciprocable table 86, and the leading end of the web is transferred from the traveling suction head 52 to the table 86. At this moment suction is also applied to the pick-up table 74.

While the traveling suction head 52 is carrying the leading end of the web over the table 86, table 86 is in a slightly elevated position to prevent engagement between cutting roller 54 and knife 98. As is best seen in FIG. 3, the knife 98 has a shape roughly resembling a horseshoe, or inverted U, and extends across the full width of the pick-up table 74 to which it is secured by suitable screws. The knife remains in fixed position at all times.

After transfer of the leading end of the web from traveling suction head 52 to table 86 has been effected, the table 86 is lowered slightly so that the upper edge of knife 98 projects above its surface. Carriage 48 and traveling suction head 52 are then resuming their forward motion to the right, as seen in the drawings. As cutting roller 54 passes over the knife 98 the desired cutting is effected. The carriage 48 and the traveling suction head 52 then reverse their motion and move backward to their starting position to clear table 86. The transfer mechanism is well known in the art being described, for instance, in Patent 2,235,857, granted to H. H. Wheeler, March 25, 1941 and in Patent 2,287,004, granted to H. H. Wheeler, June 16, 1942. The transfer T has a hollow suction chamber which is connected to a source of suction, not shown. It is controlled by means of a valve through a cam and linkage, not shown.

After travelling suction head 52 has cleared table 86, table 86 is again raised, this time for a relatively greater distance than heretofore to a position immediately underlying the lower surface of the transfer T. The lower surface of the transfer T is provided with apertures communicating with the interior by means of which suction may be applied to the binder. When the transfer T and the table 86 are properly superposed and in close proximity, suction is transferred from table 86 to transfer T which thereupon picks up the now formed binder and carries it to a position overlying the rolling table, as best seen in FIG. 2. At the same time when the suction is transferred from table 86 to transfer T, suction is also applied again to the traveling suction head 52, now in rear position, causing the latter to again pick up the leading end of the tobacco web W. The rolling table, generally indicated by RT, is of well known construction. It is provided with an internal cavity which is connected to a source of suction. Its upper surface is perforated. Overlying its upper surface is a conventional rolling apron 100. The apron 100 is provided with apertures which are in registry with the apertures in the upper surface of the table so that suction may be applied to the binder. When the transfer T is in proper position overlying the section of the apron 100 to which the binder is to be transferred, suction is cut off from the transfer T and applied through the apertures in the apron 100 to transfer the binder to the apron.

A filler 102 which may be formed of either short or long shreds, has previously been deposited in a fold or loop 104 in the apron 100. A roller 106 is now actuated into a position wherein it passes from left to right, as seen in FIGS. 2 and 7, past the filler 102 in loop 104, enclosing the filler and forming it substantially into a cylindrical shape. The roller 106 continues toward the right drawing the loop 104, enclosing the filler, after it. After a very short distance, it engages both ends of the binder B. The rolling continues with the binder B being drawn into fold 104 and passing about the filler 102.

As mentioned previously, the rolling herein differs substantially from rolling as currently practiced in the machine rolling of a cigar bunch. Instead of starting at one end only and progressively rolling more and more of the filler in the coiled binder, the binder, because of its unusual conformation, engages both ends of the filler simultaneously and the rolling continues toward the center of the bunch from both ends simultaneously.

Means are provided for applying a daub of paste to the right-hand extremity of the binder, as seen in FIG. 2, in such a position that it will be divided when the double length bunch is severed at its lateral center to form two bunches. This comprises a paste pot 108 having a paste roller 110 which dips into the paste. The paste applicator 112 is actuated under control of a reciprocable arm 114 to engage with the surface of the roller 110 and then to apply the paste to the binder as indicated by 116. The pasting mechanism is also well known in the art being shown, for instance, in Patent 2,391,294, granted to S. Clausen, December 18, 1945.

Figure 5:
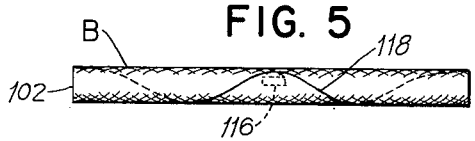
FIG. 5 shows, in side elevation, or plan, a double length bunch formed by rolling from the two ends simultaneously toward the middle.

Reference to FIG. 5 shows the appearance of the bunch formed with the binder disposed as in FIGS. 2 and 3. It will be observed that the rolling from the ends toward the center results in an exterior central flap 118. This is secured to the bunch by means of a single daub of paste 116, which extends on both sides of a median lateral line. The bunch may, if desired, be severed at this time by cutting laterally midway between its ends, so that central flap 118 is divided into two sections with a portion of the paste applied to each section so that it may be securely affixed to the bunch. Alternatively, and preferably, it may be wrapped in a wrapper corresponding substantially to the double length binder and thereafter severed.

Refer now to FIG. 6. FIG. 6 shows an arrangement for forming a double length bunch wherein the rolling may start from the central portion of the binder and progress simultaneously toward the two ends. Except for the changed shape of the knife 120, which has its bowed central portion disposed toward the left in FIG. 6, rather than toward the right, as shown in FIGS. 2 and 3, and except also for the provision of two pasters 122 and 124, the arrangement in FIG. 6 corresponds to that heretofore described. It will be observed from reference to FIG. 6 that, after rolling begins, the filler 102 will engage first with the central portion of the binder on the rolling table RT and as rolling proceeds it will progress simultaneously toward the two ends of the binder.

Prior to rolling, the pasters 122 and 124 will be reciprocated between the rollers in paste pots 126 and 128 and the respective ends of the binder which they serve, as seen in FIG. 6, to apply a daub of paste to the areas 130 and 132, respectively, on the ends of the binder.

Reference to FIG. 8 shows a double length bunch which has been rolled from the center toward the two ends. Obviously such a double bunch will have two binder flaps on the exterior of the bunch, one at each end, and each will be secured to its individual section of the double length bunch by an individual daub of paste, such as 130 and 132. The binder convolutions at all other parts of the double bunch will be formed in superposed layers which terminate in the individual exterior flap at each end. Each end is then pasted individually. The structure of FIG. 8, may, therefore, be severed, if desired, at its middle portion to form two firmly bound average size bunches.

It is considered that, in view of the description in the foregoing, it is not necessary to describe the arrangement for forming more than two cigars simultaneously in detail as it is substantially the same as for forming the bunch of double length. This will now be done generally with reference to FIG. 9.

Figure 9:
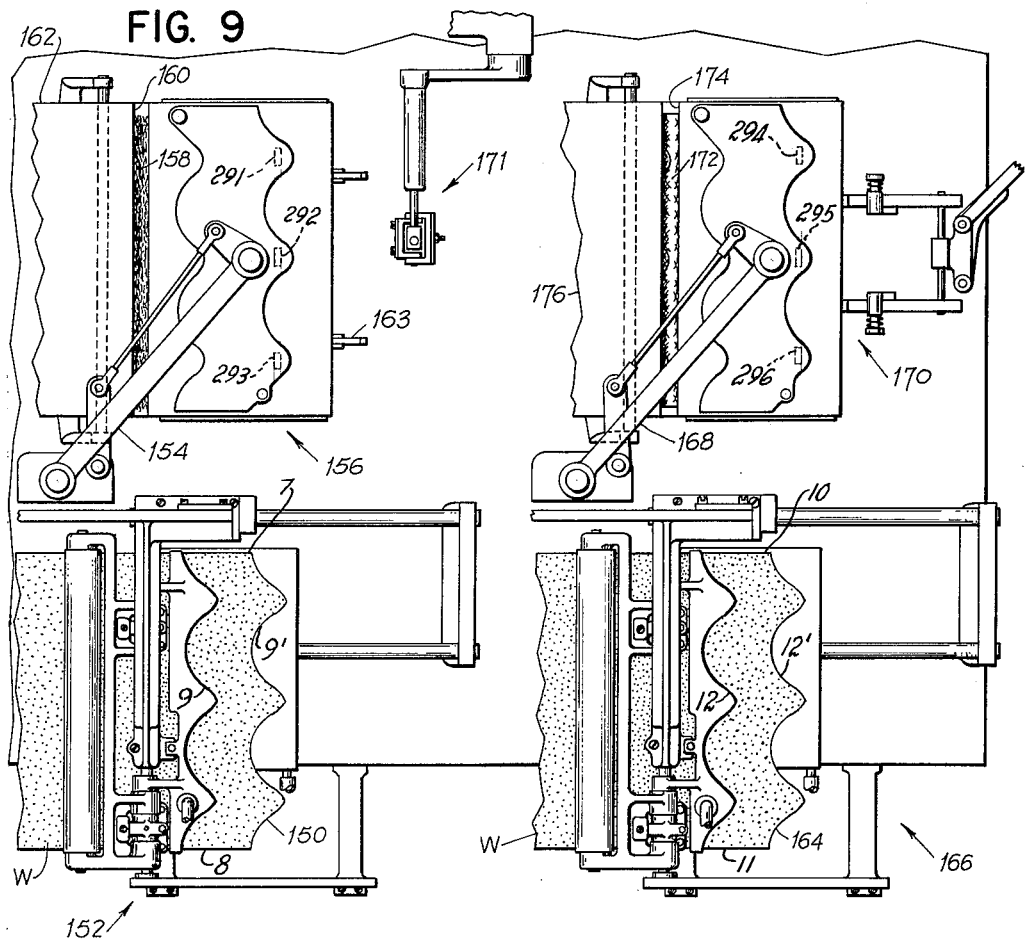
FIG. 9 is a schematic diagram of an arrangement for forming multi-unit cigars formed by rolling from the ends toward the middle of each unit.

FIG. 9, shows schematically, the arrangeemnt wherein a cigar is made by making a multiple length binder, transferring it to a bunch rolling table, forming a filler of multi-unit length and spiralling the binder about the filler to form a bunch of multi-unit length. Simultaneously with the forming of the binder, a wrapper of multiple length is formed and transferred to a wrapper rolling table. The multi-unit length bunch is transferred from the bunch rolling table to a pocket in the apron of the wrapper rolling table and the bunch is rolled in the wrapper. The rolling of the bunch or the cigar in the binder or wrapper may be performed with the binder or wrapper oriented in either of the two directions heretofore described, that is toward the legs or toward the center.

The mechanism which performs the operation that forms the multi-unit length wrapper, transfers it to the wrapper rolling table and rolls the wrapper about the bunch, is substantially the same as that described herein for the bunch forming mechainsm. The bunch transfer which transfers the bunch from the bunch rolling table to the wrapper rolling table may be substantially similar to any of a number of bunch transfers well known in the art.

The mechanisms are operated in synchronism to produce one multi-cigar unit per cycle of operation. The time of each cycle corresponds generally to the time presently required to roll a single cigar bunch. Since this is faster than the time presently required to wrap a cigar in the widely used nest-of-rollers mechanism, the actual time of manufacture of the multi-unit cigar is less than presently required to perform the corresponding operations on a single cigar.

In FIG. 9 a binder 150 for enclosing filler having a length of six bunches, is shown on a binder web feed mechanism indicated generally as 152. A transfer 154 transfers the binder to the rolling table generally indicated as 156. The filler 158 is deposited in a loop 160 in the apron 162. The bunch is rolled and delivered to the fingers such as 163.

A wrapper 164 suitable for enclosing a bunch having a length suitable for six cigars is cut on a wrapper web feed table generally indicated as 166. A transfer 168 transfers the wrapper to the wrapper rolling table, generally indicated as 170. The long bunch 172 is transported by transfer 171 from the fingers to loop 174 in wrapper rolling apron 176 and the long bunch is rolled in the long wrappers. The mechanism is controlled so that the four major operations are carried on substantially simultaneously.

Figure 12:
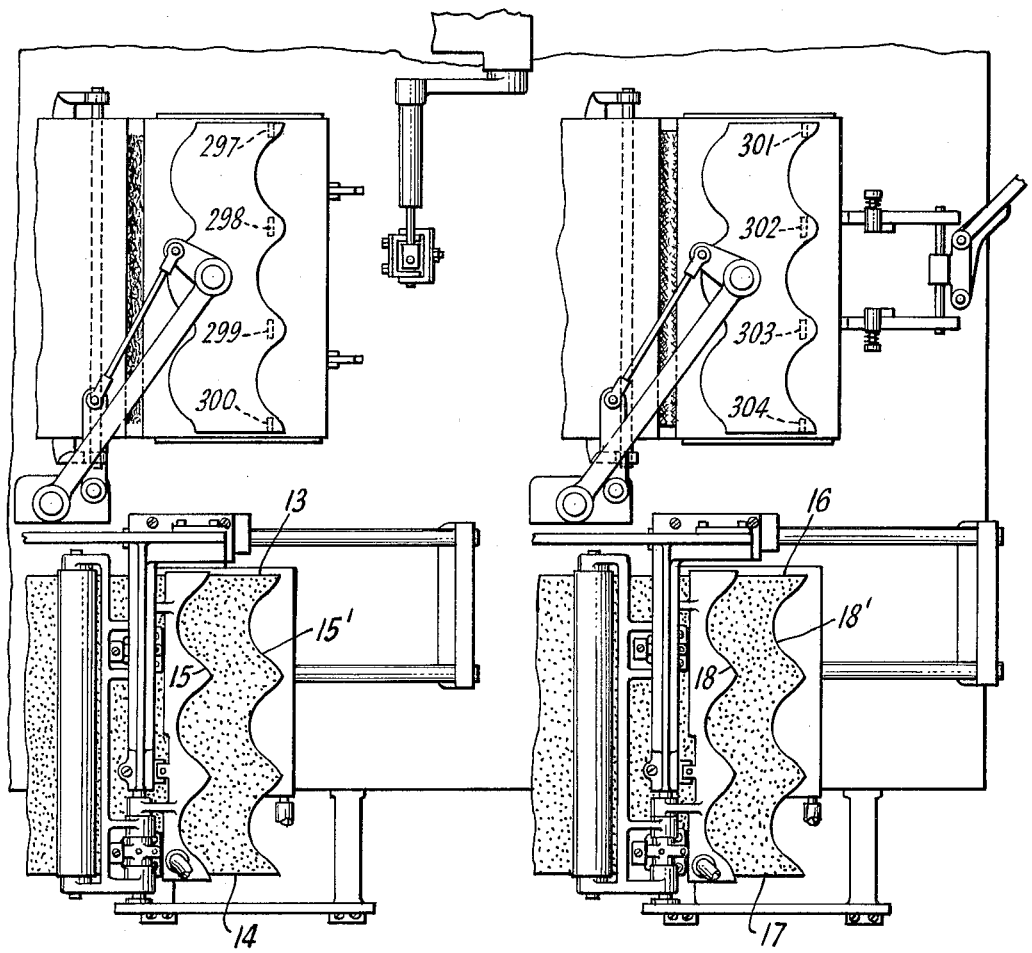
FIG. 12 is a schematic diagram of an arrangement for forming multi-unit cigars by rolling from the middle toward the ends of each unit.

FIG. 12 is identical with FIG. 9 except it is arranged so that rolling of the individual bunch units and cigar units starts at the middle and progresses towards the ends of each unit.

Figure 10:
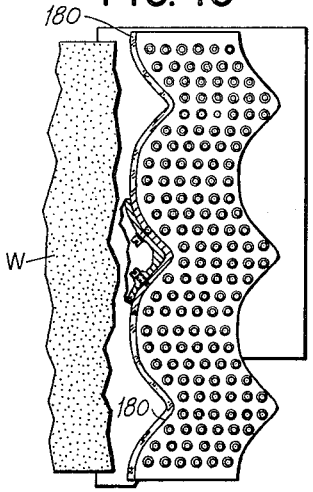
FIG. 10 is a plan view showing a cutter for cutting more than two binders, or more than two wrappers simultaneously.

FIG. 10 shows a knife 180 suitable for severing a binder or a wrapper for a bunch or cigar having a length of six bunches or six cigars. It is intended to be exemplary of a knife for forming more than two such units without limitation.

Figure 11:
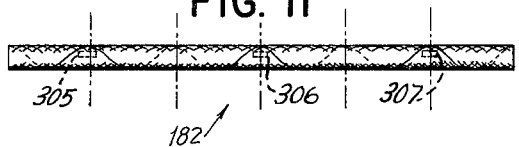
FIG. 11 is a side elevation or plan view of a multi-unit cigar having more than two cigar units prior to severance.

FIG. 11 shows a bunch, or cigar, 182 of multi-unit length. It is intended to exemplify a bunch or cigar having more than two such units without limitation.

The edges of the web W which constitute two of the four ends of the double binder in FIG. 2 are designated 1 and 2 and the opposed formed sides of the double binder are designated 3 and 3'. The corresponding edges of the web W which constitute two of the four ends of the double binder in FIG. 6 are designated 4 and 5 and the opposed formed sides of the binder are designated 6 and 6'. The edges of the web W which constitute two of the ends of the multi-binder in FIG. 9 are designated 7 and 8 and the opposed formed sides are designated 9 and 9'. The edges of the web which constitute two of the ends of the multi-wrapper in FIG. 9 are designated 10 and 11 and the opposed formed sides are designated 12 and 12'. The edges of the web W which constitute two of the ends of the multi-binder in FIG. 12 are designated 13 and 14 and the opposed formed sides of the multi-binder are designated 15 and 15'. The edges of the web which constitute two of the ends of the multi-wrapper in FIG. 12 are 16 and 17 and the opposed formed sides of the multi-wrapper are designated 18 and 18'.

The areas to which paste is applied in FIG. 9 are designated 291, 292, 293, 294, 295 and 296. The areas to which paste is applied in FIG. 12 are designated 297, 298, 299, 300, 301, 302, 303 and 304. The areas to which paste is applied in FIG. 11 are designated 305, 306 and 307.

What is claimed is:

1. The method of making two cigar bunches simultaneously, which method comprises the following steps:
 (A) Forming one substantially cylindrical filler of tobacco of double-bunch length;
 (B) Providing a continuous web of tobacco, said web having two opposed parallel rectilinear edges, said edges spaced apart a distance equal substantially to the combined length of two bunches;
 (C) Cutting off the free end of said web repetitively by equal substantially U-shaped cutting strokes, each stroke extending throughout said distance, to provide successive one-piece substantially U-shaped binders, each binder having two opposed parallel edges formed by the edges of said web, having a width correlated to the diameter of the bunch and extending in the direction of the length of said web, and having two opposed parallel substantially U-shaped sides substantially symmetrical with respect to a line parallel to and midway between said edges;
 (D) Rolling the binder around the filler, starting with the middle of the U at the middle of the cylinder;
 (E) Continuing the rolling until the two legs of the U encoil the two ends of the filler substantially simultaneously;
 (F) Pasting the two legs, to prevent unravelling after severing the double-bunch at its middle.

2. The method of making a cigar bunch of double length for use in two cigars, which method comprises the following steps:
 (A) Forming one substantially cylindrical bunch filler of tobacco of substantially double-bunch length;
 (B) Providing a continuous web of tobacco, said web having two opposed parallel rectilinear edges, said edges spaced apart a distance equal substantially to the combined length of two bunches;
 (C) Cutting off the free end of said web repetitively by equal substantially U-shaped cutting strokes, each stroke extending throughout said distance, to provide successive one-piece substantially U-shaped binders, each binder having two opposed parallel edges formed by the edges of said web, having a width correlated to the diameter of the bunch and extending in the direction of the length of said web, and having two opposed parallel substantially U-shaped sides substantially symmetrical with respect to a line parallel to and midway between said edges;

(D) Rolling the binder about the filler starting with the two ends of the legs of the U at the two ends of the filler;

(E) Continuing the rolling of the two legs of the U about the two ends of the filler simultaneously, progressively toward the middle of the filler and the middle of the U-shaped binder;

(F) Pasting the middle only of the double bunch so formed, to prevent unravelling after severing the double-bunch at its middle.

3. The method of substantially increasing cigar bunch output comprising the following steps:

(A) Forming a cylindrical tobacco filler having a length substantially equal to an integer multiple of the length of a desired cigar bunch of predetermined size;

(B) Providing a continuous web of tobacco, said web having two opposed parallel rectilinear edges, said edges spaced apart a distance equal substantially to the length of said filler;

(C) Cutting off the free end of said web repetitively by single equal multi U-shaped cutting strokes, each stroke extending throughout said distance, to provide successive one-piece substantially multi U-shaped binders each binder having two opposed parallel edges formed by the edges of said web, having a width correlated to the diameter of the bunch, and extending in the direction of the length of said web, and having two opposed parallel multi U-shaped sides, the sides of each such U being substantially symmetrical with respect to an individual line through the center of each such U parallel to said edges;

(D) Spiralling the binder about the filler, starting at the middle of the arcuate portions of each of the U's and progressing simultaneously toward the ends of the legs of each U;

(E) Pasting the ends of the legs of the U's to prevent unravelling of the binder.

4. The method of substantially increasing cigar bunch output which comprises the following steps:

(A) Forming a cylindrical tobacco filler having a length substantially equal to an integer multiple of the length of a desired cigar bunch of predetermined size;

(B) Providing a continuous web of tobacco, said web having two opposed parallel rectilinear edges, said edges spaced apart a distance equal substantially to the length of said filler;

(C) Cutting off the free end of said web repetitively by single equal multi U-shaped cutting strokes, each stroke extending throughout said distance, to provide successive one-piece substantially multi U-shaped binders, each binder having two opposed parallel edges formed by the edges of said web, having a width correlated to the diameter of the bunch, and extending in the direction of the length of said web, and having two opposed parallel multi U-shaped sides, the sides of each such U being substantially symmetrical with respect to an individual line through the center of each such U parallel to said edges;

(D) Spiralling the binder about the filler starting at the ends of the legs of the U's and progressing simultaneously from the ends of said legs toward the middle of the arcuate portion of each U;

(E) Pasting the arcuate portions to prevent unravelling of the binder.

References Cited by the Examiner

UNITED STATES PATENTS

| 1,257,815 | 2/1918 | Courtinade | 131—15 |
| 1,999,896 | 4/1935 | Dahlstrom | 131—46 X |
| 2,335,292 | 11/1943 | Messenger | 83—48 X |
| 2,740,443 | 4/1956 | Brown et al. | 131—46 X |
| 3,016,779 | 1/1962 | Gustavson et al. | |
| 3,046,993 | 7/1962 | Rich | 131—15 X |
| 3,064,658 | 11/1962 | Verbakel | 131—15 X |
| 3,105,497 | 10/1963 | Petri et al. | 131—35 |

FOREIGN PATENTS

| 204,940 | 8/1959 | Austria. |
| 565,360 | 3/1958 | Belgium. |
| 1,260,450 | 3/1961 | France. |
| 405,242 | 10/1924 | Germany. |
| 8,179 | 1890 | Great Britain. |
| 18,827 | 1912 | Great Britain. |

SAMUEL KOREN, *Primary Examiner.*